US006051326A

United States Patent [19]

Fife

[11] Patent Number: 6,051,326

[45] Date of Patent: Apr. 18, 2000

[54] VALVE METAL COMPOSITIONS AND METHOD

[75] Inventor: James A. Fife, Reading, Pa.

[73] Assignee: Cabot Corporation, Boston, Mass.

[21] Appl. No.: 08/845,736

[22] Filed: Apr. 26, 1997

[51] Int. Cl.[7] ........ B32B 5/14

[52] U.S. Cl. ........ 428/610; 428/662; 148/247; 148/668

[58] Field of Search ........ 148/247, 668; 420/427; 428/607, 610, 662

[56] References Cited

U.S. PATENT DOCUMENTS

| | | | |
|---|---|---|---|
| 3,265,540 | 8/1966 | Foley | 148/668 |
| 3,497,402 | 2/1970 | Douglass et al. | 148/668 |
| 3,647,420 | 3/1972 | Restelli | 75/84 |
| 3,850,701 | 11/1974 | Itai et al. | 428/472.2 |
| 4,062,679 | 12/1977 | Marsh et al. | 75/245 |
| 4,097,347 | 6/1978 | Packer | 204/109 |
| 4,235,629 | 11/1980 | Marsh et al. | 420/427 |
| 4,483,819 | 11/1984 | Albrecht et al. | 419/2 |
| 4,574,333 | 3/1986 | Snyder | 361/433 |
| 4,646,197 | 2/1987 | Wong | 361/307 |
| 4,722,756 | 2/1988 | Hard | 148/126.1 |
| 4,859,257 | 8/1989 | Bates et al. | 148/422 |
| 4,960,471 | 10/1990 | Fife et al. | 148/20.3 |
| 5,100,486 | 3/1992 | Krikorian et al. | 148/248 |
| 5,242,481 | 9/1993 | Kumar | 75/364 |
| 5,605,561 | 2/1997 | Iwabuchi et al. | 75/364 |

FOREIGN PATENT DOCUMENTS

| | | |
|---|---|---|
| 966589 | 8/1961 | European Pat. Off. . |
| 1011715 | 12/1965 | European Pat. Off. . |
| 36-8405 | of 1961 | Japan . |

OTHER PUBLICATIONS

Metals Division, National Research Corpoation, Technical Data Sheet, "Stable Grain Size Tantalum", 1964, see entire document.

*Primary Examiner*—Prince Willis
*Assistant Examiner*—Andrew L. Oltmans

[57] ABSTRACT

Valve metal articles such as wire, sheet or powder having a second metal, preferably in a peripheral margin, prepared by coating the valve metal with a salt solution of the metal additive and heat treating in the presence of an oxygen getter to remove the oxygen from the valve metal and the anion of the metal salt to form the metal additive. For tantalum wire a preferred second metal is nickel. A preferred oxygen getter is magnesium. Nickel-containing tantalum wire is useful for enhance bonding to sintered pressed tantalum powder pellets in the production of electrolytic capacitors.

4 Claims, No Drawings

VALVE METAL COMPOSITIONS AND METHOD

BACKGROUND OF THE INVENTION

Valve metals such as tantalum, niobium are characterized by a stable oxide coating which imparts useful properties such as corrosion resistance and electrical resistance which make such metals attractive for various applications such as an anode material in electrolytic capacitors and as a material of construction in certain corrosive environments. The oxide coating can be a hindrance in bonding valve metals, e.g. in sintering pressed valve metal powders into a pellet bonded to a valve metal lead wire or lead tab. As finer valve metal powders are used to achieve higher capacitance, lower sintering temperatures are used to prevent excessive loss of surface area from exposure to sintering temperatures. Moreover, as satisfactory particle to particle bonding is achieved in the pressed powder, the particle to lead connection bond can be deficient at lower sintering temperatures allowing the sintered pellet to be readily pulled off of the lead wire or lead tab during fabrication or use of the capacitor.

SUMMARY OF THE INVENTION

This invention provides valve metal including a second metal where the second metal is preferably at a greater concentration at or near the peripheral portion of the valve metal than within the valve metal. Such valve metal may be in a variety of forms, e.g. wire, sheet including foil or particulate including flaked, nodular or angular powder. In such forms the second metal is concentrated in the valve metal at the periphery of the valve metal form or valve metal article. Valve metal wire according to this invention is useful in the fabrication of anodes for electrolytic capacitors to provide enhanced bonding strength between such wire and sintered pellets of valve metal powder. Value metal sheet according to this invention is similarly useful to form lead tabs on sintered valve metal powder anodes.

This invention also provides a method of adding a second metal to valve metal comprising:

(a) coating a valve metal surface with a solution of a second metal; and (b) heating said valve metal and coating in the presence of an oxygen getter at a temperature sufficient to remove oxygen from said valve metal and to provide said valve metal with said second metal in a peripheral region of said valve metal. Preferably, the second metal is provided at or near to the surface of the valve metal, e.g. in a peripheral region, to improve a surface property of the valve metal

DETAILED DESCRIPTION OF PREFERRED EMBODIMENTS

As used herein the term “valve metal” refers to tantalum and niobium and alloys of valve metals including alloys of tantalum and niobium and valve metals with grain growth inhibitors such as tantalum with up to about 1000 ppm of silicon or yttrium oxide, niobium with zirconium and the like. Unlike the second metal which is preferably concentrated at a peripheral region, other components of a valve metal such as grain growth inhibitors and alloying elements are more uniformly distributed throughout the valve metal.

As used herein the term “second metal” refers to a metal component in a valve metal which is not uniformly distributed throughout the valve metal. Useful second metals can be found in Groups IVB, VB, VIB, VIIB and VIII of the periodic table and include tantalum, niobium, nickel, titanium, zirconium, tungsten and iron. Nickel is a preferred second metal for tantalum articles to be bonded to sintered tantalum powders.

In the method of this invention a second metal is added to valve metal by coating a valve metal surface with a compound of the second metal and heating the coated valve metal in the presence of an oxygen getter at a temperature sufficient to remove oxygen from said valve metal and provide the metal in the peripheral region of the valve metal. The getter should also be effective in removing anion associated with the second metal in the coating. This method is especially useful in preparing valve metal wire, powder and sheet with a second metal. When such second metal-containing wire is used as lead wire for preparing sintered anodes of pelletized valve metal powder, higher bond strength between sintered powder and lead wire can be achieved. Such wire is expected to be useful with valve metal powder which is preferably sintered at low temperatures, e.g. less than 1500° C. for tantalum powders or lower such as in the range of 1200 to 1400° C. Valve metal sheet according to this invention is also expected to be useful in making lead tabs for sintered anodes of high capacitance valve metal powder. Thus, preferred articles of this invention are valve metal wires and sheet having a second metal which improves a surface property, e.g. bonding to sintered bodies of valve metal powder. Such lead wires commonly have diameters in the range of about 100 to 1000 micrometers ($\mu$m); sheet may be thinner, e.g. on the order of 50 $\mu$m; and foil, even thinner. Second metal-containing powders according to this invention may be useful as bonding agents for joining valve metal parts or for low temperature sintering valve metal powders or simply providing metal additives, e.g. dopants, to valve metals in peripheral regions.

Preferred wire and sheet provided by this invention have a second metal concentrated in the peripheral region of the valve metal article where the thickness of the peripheral region will depend on diffusion rate of the second metal into the valve metal. Factors influencing diffusion are expected to include the concentration per unit surface area of the second metal in the coating and the time and temperature at which the valve metal is to thermal treatment as with exposure to the oxygen getter. In many cases it is preferable that the peripheral region in which the second metal is concentrated be as thin as possible to provide enhanced surface properties without affecting bulk properties of the valve metal. Another benefit of thin peripheral region of concentrated second metal is that the second metal concentration can be reduced to minimal levels after the enhanced surface properties have been utilized, e.g. by thermal treatment to facilitate diffusion of the second metal into the bulk of the valve metal which has a low concentration, if any, of the second metal, e.g. into the core region of a wire or center region of a sheet. In preferred aspects of this invention the peripheral region of concentrated second metal can be within 1 to 2 micrometers from the surface. For some applications the second metal concentration in the peripheral region can be up to about 1 weight percent or more. Based on the total weight of valve metal in an article the bulk concentration of the second metal can be in the range of 2 to 2000 ppm. For some applications bulk concentration of the second metal can be 5 to 200 ppm. For other application the bulk concentration of the second metal can be 5 to 50 ppm.

A useful second metal for tantalum is nickel which is stable and resistant to corrosion. The amount of nickel used in tantalum wire will preferably be the minimal amount that will provide enhanced properties, i.e. enhanced bonding to sintered valve metal powder with minimal adverse effect on electrical properties of finished anodes. An advantage of this invention is that during thermal sintering the concentration of the second metal, e.g. nickel, will initially be higher in a peripheral region to facilitate bonding of powders to the wire; and, as sintering continues the second metal will tend to diffuse away from the surface into the center of the wire to provide a low concentration at the peripheral region so as to not adversely affect electrical properties of an electrolytic capacitor.

In the method of this invention uniform coating of the second metal is preferably provided by using a solution of a soluble salt of the second metal. Such a solution can be coated onto the oxygen passivated surface of valve metal. The metal solution can be applied in an organic or aqueous solution. Useful anions for such soluble salts of such include chloride, sulfate, carbonate and nitrate. Useful organic solvents include acetone, xylene, methanol, acetonitrile, methylene chloride, N-pyrrolidone, dimethylsulfoxide, dimethylacetamide, dimethylformamide, methyl ethyl ketone, glycol ethyl ether and the like. To assist in forming and maintaining a uniform coating on the surface the solution can preferably also contain adjuvants such as binders, thickeners, leveling agents, surfactants and the like as are commonly employed in coatings. Useful adjuvant binders include polypropylene carbonate, hydroxypropyl methylcellulose, polyvinylalcohol, polyvinylbutyral and polymeric latex; a preferred adjuvant binder is polypropylene carbonate. The concentration of metal and adjuvant will depend on the thickness of a uniform coating that can be applied and the desired second metal concentration. Such solutions can be applied to the valve metal by any known method, e.g. spraying, brushing, dipping etc. A useful application for wire coating includes drawing the wire through a porous medium saturated with the solution or through a bath of the solution. The coating is fixed by evaporating the solution and/or setting, e.g. gelling or crosslinking, a binder adjuvant A useful way for fixing the coating on a wire is to draw the coated wire through a convection heating zone to assist in solvent removal. A useful convection heating zone can be a vertical or horizontal tubular chamber with a heated gas flow concurrent or countercurrent to the motion of the wire in the chamber.

In the method of this invention, after the metal compound coating is fixed, the valve metal article is heated in the presence of an oxygen getter at a temperature sufficient to remove the oxide coating from the valve metal and to provide reduced second metal in the valve metal. Useful oxygen getters are materials having a greater affinity for oxygen than the valve metal. Such oxygen getters include magnesium, calcium, sodium, aluminum, carbon, titanium and zirconium. The getter must also have a higher affinity for oxygen that the second metal, e.g. when the second metal is titanium or zirconium. The oxygen getter can also be effective in extracting the anion from the second metal salt. Magnesium is a preferred oxygen getter when nickel chloride is used to provide the second metal salt. When the article is wire, the wire can be loosely wound on a spool, e.g. a valve metal spool, to provide exposure to the spooled wire to a gas phase comprising the getter material. The article is preferably exposed to the getter material in a vacuum furnace which allows evacuation of atmospheric oxygen and a relatively high concentration of the oxygen getter in an inert gas phase, e.g. gas phase comprising argon and magnesium vapor. When magnesium is used as the oxygen getter temperatures above 800° C. are useful for removing the surface oxygen from the valve metal. Procedures for removing oxygen from valve metals can be found in U.S. Pat. Nos. 3,647,420; 4,722,756; 4,960,471 and 5,241,481 all of which are incorporated herein by reference.

Valve metal wire prepared by this invention is typically softened by heat treatment with oxygen getter; the tensile strength of such softened wire is often unsatisfactory for use as lead wire in the manufacture of valve metal anodes for electrolytic capacitors. Heat treatment and quenching to harden the wire will generally be detrimental for use in capacitor applications due to oxygen pickup in such treatment. It has been discovered that the surface and peripheral region of second metal-containing valve metal wire of this invention is durable, unlike many surface coatings, and can tolerate wire drawing to a reduced diameter which effectively cold works the wire to provide sufficient strength for capacitor lead applications. In the case where the metal salt coating was not uniformly applied, e.g. striated, and resulting in some peripheral region with a low concentration of the second metal, it may be useful to apply an oxide coating to the wire prior to drawing to minimize galling from the drawing dies.

The above described process can also be modified to provide a second metal in valve metal powders, e.g. powders having dimensions on the order of 1 to 10 micrometers. For example, valve metal powder can be coated with second metal salt solution and dried e.g. in a fluid bed. Such metal salt-coated valve metal powder can be treated with an oxygen getter to form the second metal in the valve metal powder. Useful valve metal powders of this invention can include nickel-containing tantalum powder and niobium-containing tantalum powder and tantalum-containing niobium powder. A nickel-containing tantalum powder could be useful as a bonding agent for tantalum parts. Tantalum-containing niobium powder could provide enhanced electrical properties to niobium powders.

The following example serves to illustrate certain aspects of this invention.

EXAMPLE 1

A 0.8 wt % nickel coating solution was prepared by dissolving 32.4 g of nickel chloride hexahydrate in 200 ml of methanol and slowly adding the nickel chloride/methanol solution to 800 ml of a 5 wt % solution of polypropylene carbonate in acetone which was prepared by adding acetone to a 20 wt % solution of QPAC-40-M polypropylene carbonate obtained from PAC Polymers, Allentown, Pa. A tantalum wire of about 710 μm in diameter was coated by passing the wire through a sponge saturated with the 0.8 wt % nickel solution and then passing the wire through an length of Inconel tubing with a co-current stream of warm air to assist in solvent evaporation. The wire with a dried coating was wound loosely on a tantalum spool and a quantity of magnesium powder were placed in a tantalum canister in a vacuum oven. The quantity of magnesium powder was sufficient to remove the surface oxygen from the tantalum (wire, spool and canister) and the chloride ions from the coating. Air was evacuated from the furnace and replace with argon at low pressure (about 13 Pa). The temperature was raised to 925° C. for a period of 2 hours to allow vaporized magnesium to be in contact with the surface of the coated wire. After the oven was cooled, air was introduced into the oven and the wire removed and washed in an mixed acid bath of about 20% nitric acid and 2% hydrofluoric acid to remove residual magnesium, magnesium oxide and magnesium chloride. The wire was softened by the thermal treatment and exhibited a tensile strength of 530 megaPascals (MPA) (77,000 psi). Bulk analysis of the wire showed overall nickel content to be 45 ppm. Although the wire did not have a nickel coating, that amount of nickel would be equivalent to a nickel surface coating of 319 Angstroms thick. SEM analysis of the surface of the wire to a depth of about 1.5 to 2 micrometers indicated the presence of a nickel and tantalum. The wire was respooled and drawn to a diameter of 240 micrometers to provide a work hardened wire which had a tensile strength of 1190 MPa (173,000 psi). SEM analysis of the surface of the drawn wire also indicated the presence of a nickel and tantalum. Surface mapping of the surface of the wire by X-ray analysis indicated uniform distribution of tantalum and nickel. A coiled segment of the drawn wire treated anodized under conditions similar to that used to anodized sintered pellets of pressed tantalum powder in the manufacture of electrolytic capacitors. When an electric current was applied to the coiled segment of the drawn wire immersed in 0.13 weight percent (wt %) phosphoric acid, bubbles in the acid indicated short circuiting through the tantalum oxide on the surface of the wire preventing buildup of an oxide layer. Another coiled segments of the wire was heated to 1300° C. for 30 minutes to simulate sintering conditions for a pressed pellet of tantalum powder. The heat treated wire was anodized for 30 minutes in a 0.13 wt % phosphoric acid at 93° C. with constant current rising to a terminal voltage of 200 volts; terminal voltage was maintained for 5.5 minutes. Segments of anodized wire were immersed in 0.1% phosphoric acid at 25° C. with an applied 180 volts for 2 minutes; DC leakage for the anodized wire segments was in the range of 0.25 to 1 milliamps per square centimeter (about 1.5 to 7 milliamps per square inch). DC leakage for a reference tantalum wire (without the second metal) was about 0.04 milliamps per square centimeter.

EXAMPLE 2

Nickel-containing tantalum wire was prepared in the manner of Example 1 except that the nickel salt solution was applied by sponge to a vertically hanging wire. The wire was work hardened by drawing to a diameter of 250 micrometers and used as lead wires in sintered tantalum powder anodes for an electrolytic capacitors. Tantalum powder was pressed in a mold around the end of the wire and the wire with pressed tantalum powder was sintered at common manufacturing conditions. The quality of powder bonding to the lead wire was tested by pulling the wire from the sintered pellet. Lead wires containing with nickel according to this invention wires were pulled from sintered pellets using 50 percent greater force than that required when a standard tantalum wire was used.

What is claimed is:

1. A tantalum wire including nickel wherein the concentration of nickel in said tantalum wire is greater at or near the surface of said tantalum wire.

2. A wire according to claim 1 wherein the amount of nickel to bulk amount of tantalum is at a ratio between 5 and 200 ppm.

3. A wire according to claim 2 wherein said ratio is between 5 and 50 ppm.

4. A tantalum wire according to claim 1 having an ultimate tensile strength greater than 120,000 psi (830 MPa).

* * * * *